United States Patent
Selker et al.

[11] Patent Number: 5,870,082
[45] Date of Patent: Feb. 9, 1999

[54] POINTING DEVICE WITH RECIPROCATING GRIP CAP

[75] Inventors: Edwin Joseph Selker, Palo Alto; Barton Allen Smith, Campell; Todd Clossen Wyant, San Jose, all of Calif.

[73] Assignee: International Business Machines Corporation, Armonk, N.Y.

[21] Appl. No.: 742,096

[22] Filed: Oct. 31, 1996

[51] Int. Cl.$^6$ .............................. G09G 5/00; H03K 17/94
[52] U.S. Cl. ........................... 345/168; 341/22; 361/680; 400/490
[58] Field of Search ................... 345/168, 161; 361/680; 364/710, 231.1, 234.4, 236, 709.12, 928.5; 341/22, 34; 400/480, 481, 490, 491, 491.2; 200/614

[56] References Cited

U.S. PATENT DOCUMENTS

| | | | |
|---|---|---|---|
| 4,543,562 | 9/1985 | Ny | 340/365 |
| 4,543,563 | 9/1985 | Wine | 340/365 |
| 5,120,923 | 6/1992 | Kato et al. | 200/520 |
| 5,183,346 | 2/1993 | Tesar | 400/490 |
| 5,456,541 | 10/1995 | Ching-Shui | 400/490 |
| 5,568,987 | 10/1996 | Franz | 400/490 |
| 5,590,020 | 12/1996 | Sellers | 361/680 |
| 5,666,112 | 9/1997 | Crowley et al. | 341/22 |
| 5,694,124 | 12/1997 | Wood | 341/22 |
| 5,701,142 | 12/1997 | Brown et al. | 345/168 |

*Primary Examiner*—Chanh Nguyen
*Assistant Examiner*—Seth D. Vail
*Attorney, Agent, or Firm*—Romualdas Strimaitis; James C. Pintner

[57] ABSTRACT

A user-manipulable in-keyboard pointing device is provided, for use in portable electronic apparatus such as laptop computers, for allowing the user to move a symbol, such as a cursor, around a GUI display. For small laptops whose displays close over their keyboards, such as in clamshell fashion, the device protects the display surface from smearing or abrasion from physical contact with the user-manipulable device. The device includes a post, rigidly coupled to motion sensors for producing motion signals, responsive to user manipulation, the post having a head-and-shoulder contour. The device further includes a resilient fingertip grip cap that fits over the head of the post. The grip cap has a shape which provides two cooperative arrangements for fitting onto the post. The first configuration, which is for normal use, has the cap projecting above the post by a first height. Responsive to downward pressure, such as exerted by the display surface when the laptop is closed, the grip cap deforms such that it now fits over the post in the second cooperative arrangement, in which the cap projects above the post by a second, lesser height. Therefore the display is less apt to become dirty or damaged that would be the case if the grip cap remained at the first height over the post.

6 Claims, 5 Drawing Sheets

POINTING DEVICE WITH RECIPROCATING GRIP CAP

FIELD OF THE INVENTION

The invention generally relates to the field of computer graphical user interface (GUI) devices. More specifically, the invention relates to user-manipulable pointing devices, and to their use in electronic apparatus such as portable laptop computers. The invention has particular applicability to laptop computers, such as IBM Corporation's ThinkPad® line of laptop computers, employing user fingertip-manipulable cursor pointing and movement devices such as IBM Corporation's TrackPoint II® and TrackPoint III® devices.

BACKGROUND OF THE INVENTION

Since the advent of the computer graphical user interface (GUI), there has been a need for a user-manipulable pointing device, used in addition to a keyboard, for allowing a user to enter input commands to move a cursor around a displayed desktop. A mouse has been the most common such device. Use of a mouse has generally required a flat working surface, so that the mouse can be slid over the surface. A mouse has been an impractical accessory for portable computers, because it must be carried separately, and because the required flat surface is not always available to the traveling user.

The advancing state of the art in component miniaturization has made possible lightweight, portable "laptop" computers. Such computers generally are about the size and dimensions of a book. They have a "clamshell" structure, in which they open by folding upward a hinged first half, substantially completely taken up on the inside by an LCD display, and a second, base, half which is mainly taken up on the inside by a keyboard. System components such as a battery, a hard disk drive, etc., are designed to be compact ad flat, so as, in most cases, to fit underneath the keyboard in the base half.

Of course, portability of a laptop computer requires that other necessary components, such as a detached mouse, an AC power cord and adapter, etc., be as compact as possible. Any such additional component detracts from the convenience and compactness of the laptop system.

Convenience and portability made a quantum leap forward with the advent of IBM Corporation's TrackPoint II® and TrackPoint III® devices (hereinafter referred to generically as "TrackPoint devices"). A TrackPoint device is a small structure, preferably resembling the eraser end of a pencil, strategically positioned in the middle of the keys of a keyboard. The user, whose hands are already in the vicinity of the TrackPoint device by virtue of being on the keys of the keyboard, manipulates the TrackPoint device with a fingertip. Signals are produced, which are processed in a manner similar to mouse signals. Responsive to the signals, the computer moves the cursor around the display in accordance with the user's fingertip manipulation.

TrackPoint devices are preferably implemented as described in co-pending, co-assigned patent application Ser. No. 08/181,648 (filed Jan. 14, 1994) and (IBM docket number AM9-96-049, serial number to be determined) (filed Oct. 23, 1996). These physical implementations essentially include a vertically oriented member, projecting slightly above the level of the keys, and a fingertip contact member, such as that described in co-pending patent application Ser. No. 08/315,651 (filed Sep. 30, 1994).

The TrackPoint device has greatly added to the user's convenience, both because it is easy to use, and also it need not be carried separately. It is small, and fits inside the laptop computer. As far as the user transporting the computer is concerned, it is as though no additional user interface device is needed at all.

However, because the TrackPoint device projects above the plane of the key surfaces, it has limited realization of the goal of making laptop computers as small and compact as possible. The problem has been that, when the lid of the computer is closed, the upper surface of the grippy top may come into direct contact with the display surface. This contact results in undesirable smearing, or even abrasion, of the display surface.

Even more serious is a problem caused when a user carries a laptop in a way that the sides of the laptop get squeezed. This can happen when the laptop is put into a briefcase along with other materials, and the briefcase is closed. If (as is all to often the case) the briefcase is overloaded, the laptop is squeezed in a way that forces the TrackPoint device against the display. This forcing can not only damage the display surface, but also damage the inner workings of displays such as liquid crystal displays (LCDs).

Therefore, there is a need for a further refinement of the structure of TrackPoint-type in-keyboard pointing devices, so that laptop displays are not damaged, and so that further reductions in the dimensions of laptops are not impeded.

SUMMARY OF THE INVENTION

It is therefore an object of the invention to provide a TrackPoint-type device which, when used in a laptop computer keyboard, reduces or eliminates the tendency to smear or abrade the display surface or damage the display structure when the laptop's clamshell halves are closed.

It is also an objective of the invention to provide such a device which, when included in a laptop keyboard, will not damage the inner workings of an LCD display when the laptop is squeezed due to non-optimal handling.

To achieve this and other objectives, there is provided, in accordance with the invention, a fingertip-manipulable pointing device for directing movement of a symbol in a display of a computer graphical user interface.

The device comprises a first member having a first physical configuration, and a second member having a physical configuration. Preferably the first member includes a post, for projecting out from between keys of a keyboard, so that the user can manipulate the device with his/her fingertip. Preferably, the second member is a fingertip grip cap, such as a resilient, pencil-eraser-shaped cap, similar in many respects to the grip caps conventionally used in IBM Corporation's TrackPoint II and TrackPoint III devices.

In accordance with the invention, however, the physical configurations of the first and second members are such that the second member has first and second possible cooperative arrangements with the first member. In other words, the first and second members fit together in two ways.

The first and second members are preferably in the first arrangement during normal use. Responsive to a sufficient downward force, such as force exerted by the surface of the display on the second member when the laptop is closed, the members move from the first arrangement to the second arrangement. In the second arrangement, the second member is pushed down onto the second member, so that the second member projects less far up than it does in the first arrangement. Accordingly, contact force between the display surface and the second member is lessened, and the likelihood of damage to the display surface is likewise lessened.

The first arrangement is preferably a quiescent monostable arrangement. The second member moves from the first arrangement to the second arrangement responsive to a predetermined application of force thereto. The second member returns from the second arrangement to the first arrangement responsive to removal of the predetermined application of force thereto.

In a preferred embodiment described below, the device remains in the first arrangement subject to increasing force, until a threshold force is reached, at which time it abruptly moves to the second cooperative arrangement. Because of this abrupt change responsive to a threshold force, a device according to the invention may be regarded metaphorically as a mechanical "fuse." Hence the title of the present patent application.

DESCRIPTION OF THE PREFERRED EMBODIMENT

The functionality of TrackPoint devices and equivalent pointing devices, joysticks, etc., as regards controlling the movement of the cursor on a GUI display are known to persons skilled in the art, such as from the above-cited references. Therefore, the present description will omit these matters, and focus on the physical structure of such devices as it relates to the objectives of the invention.

Figure 1:
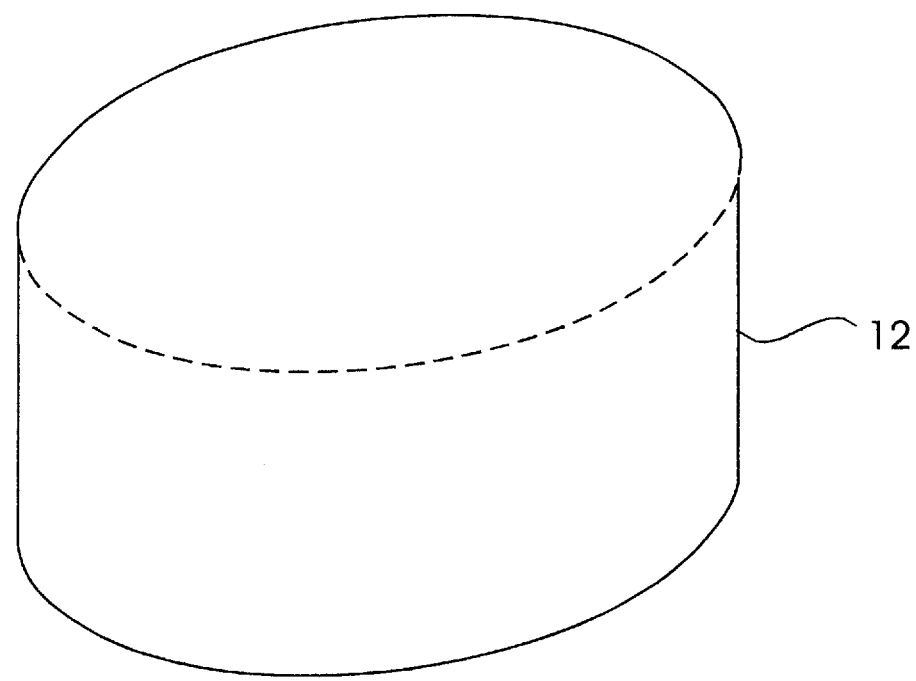
FIG. 1 is an exploded perspective view of a device according to the invention.
Figure 1:
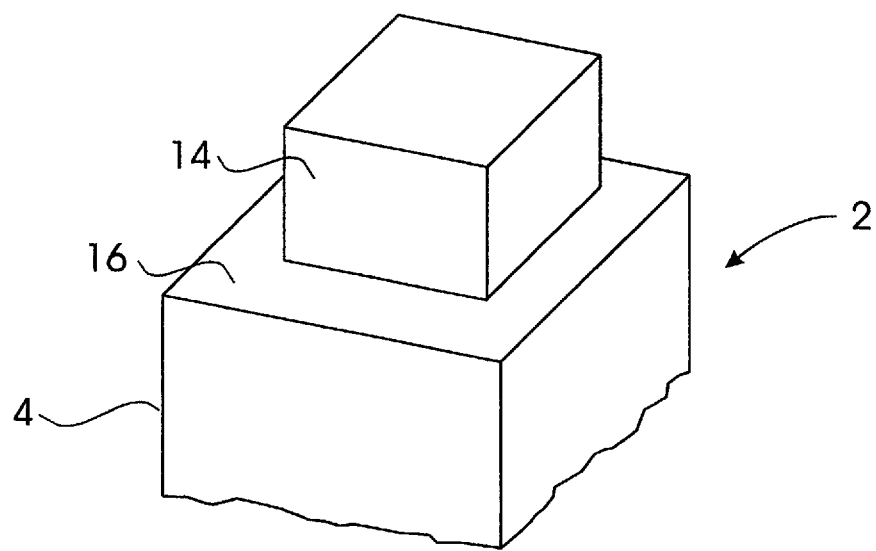

Referring to FIG. 1, there is shown an exploded perspective view of a device according to the invention. The particular device shown generally resembles the existing physical implementations of IBM Corporation's TrackPoint II® and TrackPoint III® devices, as regarding aspects not directly related to the invention.

A first member 2 is shown as including a rigid post 4. The post 4 is coupled to sensors (not shown, but preferably disposed below the portion of the post 4 shown in FIG. 1) which produce signals used by the computer to direct movement of a displayed symbol such as a cursor. In the embodiment described in co-pending U.S. patent application Ser. No. 08/181,648 (cited above), the post 4 is rigidly coupled to strain gauges laid on a flat surface. In other embodiments such as that of co-pending U.S. patent application Ser. No. (AM9-96-049) (cited above), other forms of mechanical or electrical coupling may be employed to obtain the requisite motion signals for use in controlling cursor movement.

However, for the purpose of the present invention, the discussion will focus on the upper part of the post 4.

Figure 2:
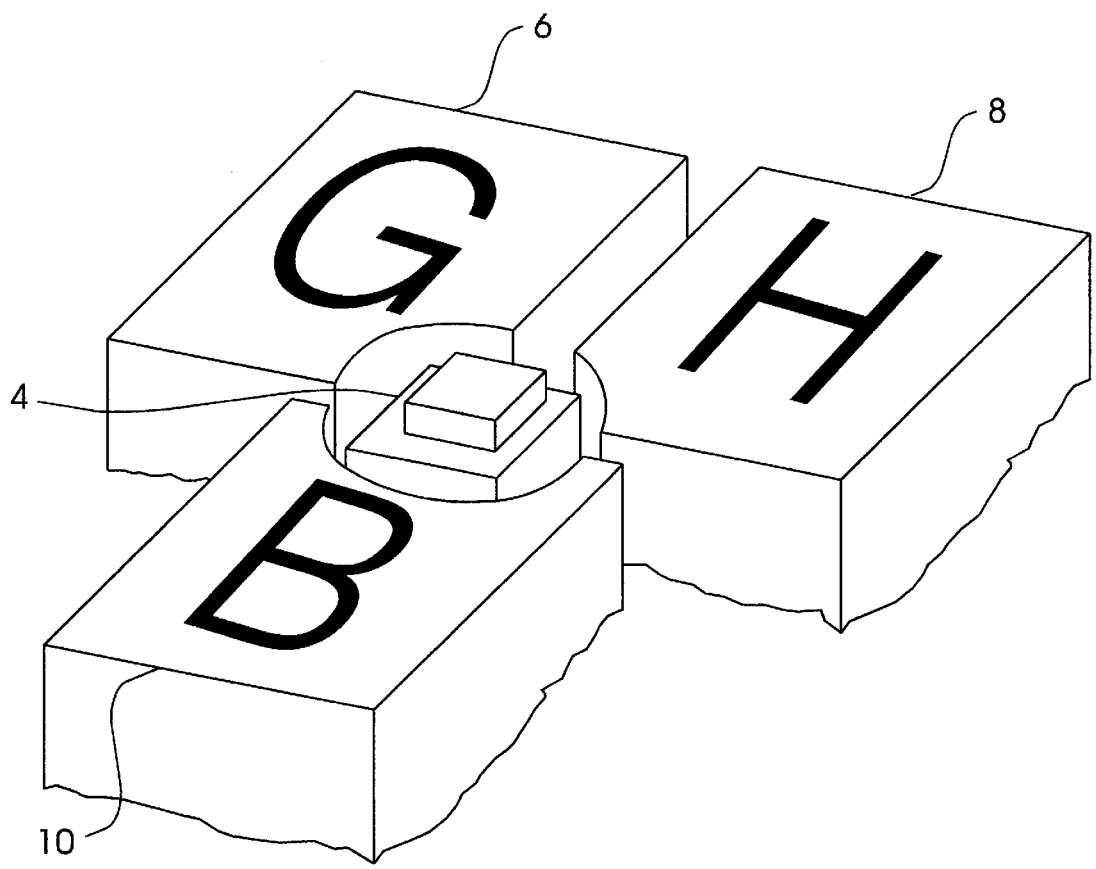
FIG. 2 is a perspective view of a portion of a keyboard, including a component according to the invention.

As shown in FIG. 2, a perspective view of a portion of a keyboard, the post 4 is positioned between keys of a keyboard, preferably in a convenient, central location between the G, H, and B keys 6, 8, and 10, as shown.

Also shown in FIG. 1 (but not shown in FIG. 2) is a second member 12, preferably a resilient fingertip grip cap.

The grip cap 12 is preferably made of materials as described in co-pending, co-assigned U.S. patent application Ser. No. 08/315,651 (cited above).

In accordance with the invention, the upper part of the post 4 and the grip cap 12 have physical configurations, i.e., shapes, which lend themselves to two distinct cooperative arrangements. That is, they have two different ways of fitting together. The two ways of fitting together are illustrated in the cross-sectional side views of FIGS. 3 and 4, which will be described in detail below.

First however, will be given a general discussion of the two cooperative arrangements. The first cooperative arrangement is a normal operating arrangement. For normal operation, i.e., any time the user's fingertip is manipulating the device, the first member preferably remains in the first cooperative arrangement. Forces of magnitudes foreseeable for normal user manipulation of the device for its intended purpose are preferably not sufficient to change the device from the first configuration to the second configuration, but this constraint is not essential to the invention.

To achieve the objective of the invention, when sufficient force is applied, such as when the lid of the laptop is closed, the device moves from the first configuration to the second configuration. The device then returns to the first arrangement responsive to removal of the predetermined application of force thereto.

The first arrangement may be thought of as a quiescent arrangement. Further, the devices preferably is monostable, in that it remains in the first arrangement, absent sufficient applied force, and returns to the first arrangement when the force is removed.

Preferably, this monostable characteristic is brought about by making the second member out of a resilient material, such as the material described in co-pending U.S. patent application Ser. No. 08/315,651 (cited above). In the second arrangement, the second member is in a deformed condition, brought about by the force pushing it against the first member. The tendency of the resilient material to return to its non-deformed condition (in the first arrangement) urges the device from the second arrangement back to the first arrangement.

Figure 3:
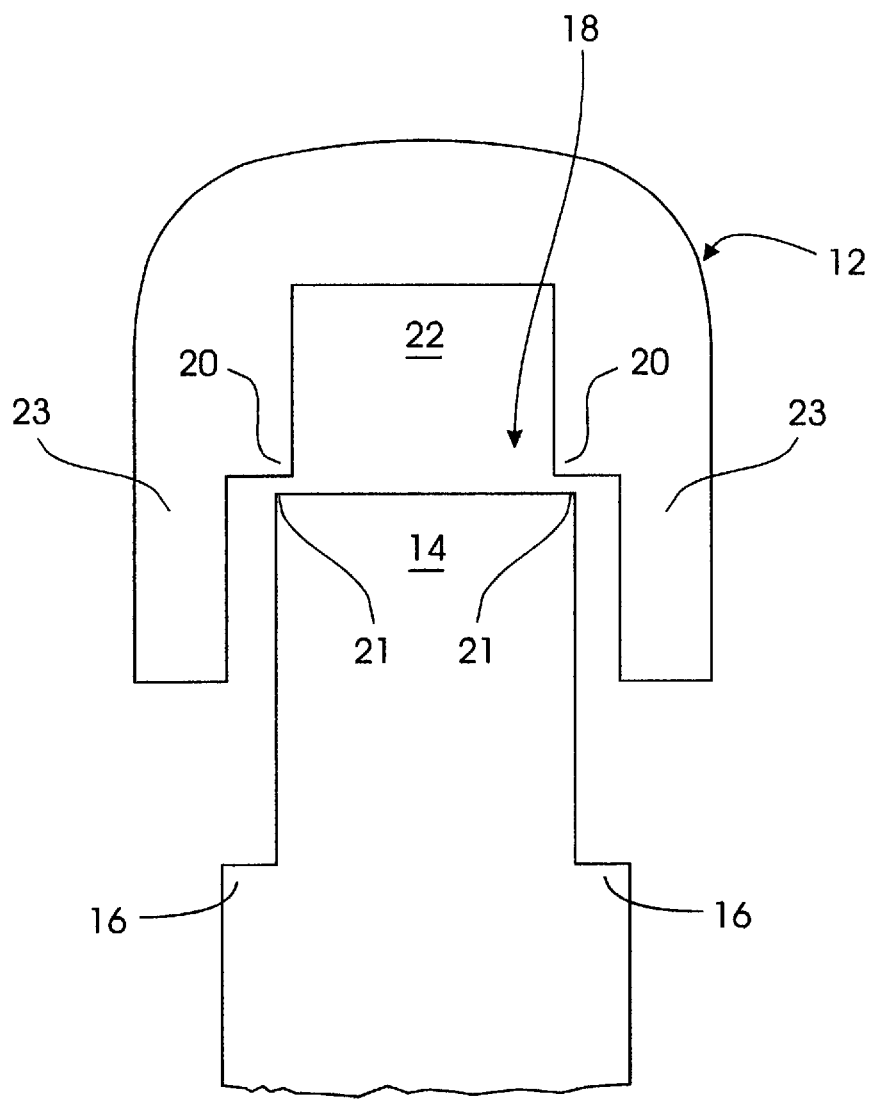
FIG. 3 is a cross-sectional side view of a device according to the invention, whose components are in a first cooperative arrangement.

The physical configurations of the first member 2 and the second member 12 may be understood with reference to a preferred embodiment as shown in FIG. 3.

The first member 2 includes a head 14, and may optionally include shoulders 16. The exact configuration of the head 14 and the shoulders 16 may vary. As shown also in FIG. 1, in one preferred embodiment the post 4 and the head 14 each have the shape of a rectangular prism. The width and length (i.e., the x and y dimensions) of the head 14 are less than those of the post 4. Accordingly, the upper surface of the post 4 surrounding the head 14 form the shoulders 16. The height of the head 14 over the shoulders 16 may be great enough to keep the shoulders 16 out of the way of the second member 12, or alternatively may be short enough that the shoulders 16 come into contact with the second member 12 (discussed below).

The second member 12 fits over the post 2, as shown in the cross-sectional view of FIG. 3. The second member 12 has an interior opening, generally shown as 18, preferably shaped to fit over the head 14. The interior of the second member 12 includes shoulders 20 and an upper opening 22.

In the first cooperative arrangement shown in FIG. 3, the shoulders 20 rest on the top of edges 21 of the head 14, and the upper opening 22, which has x and y dimensions slightly smaller than those of the head 14, is located above the head 14.

Figure 4:
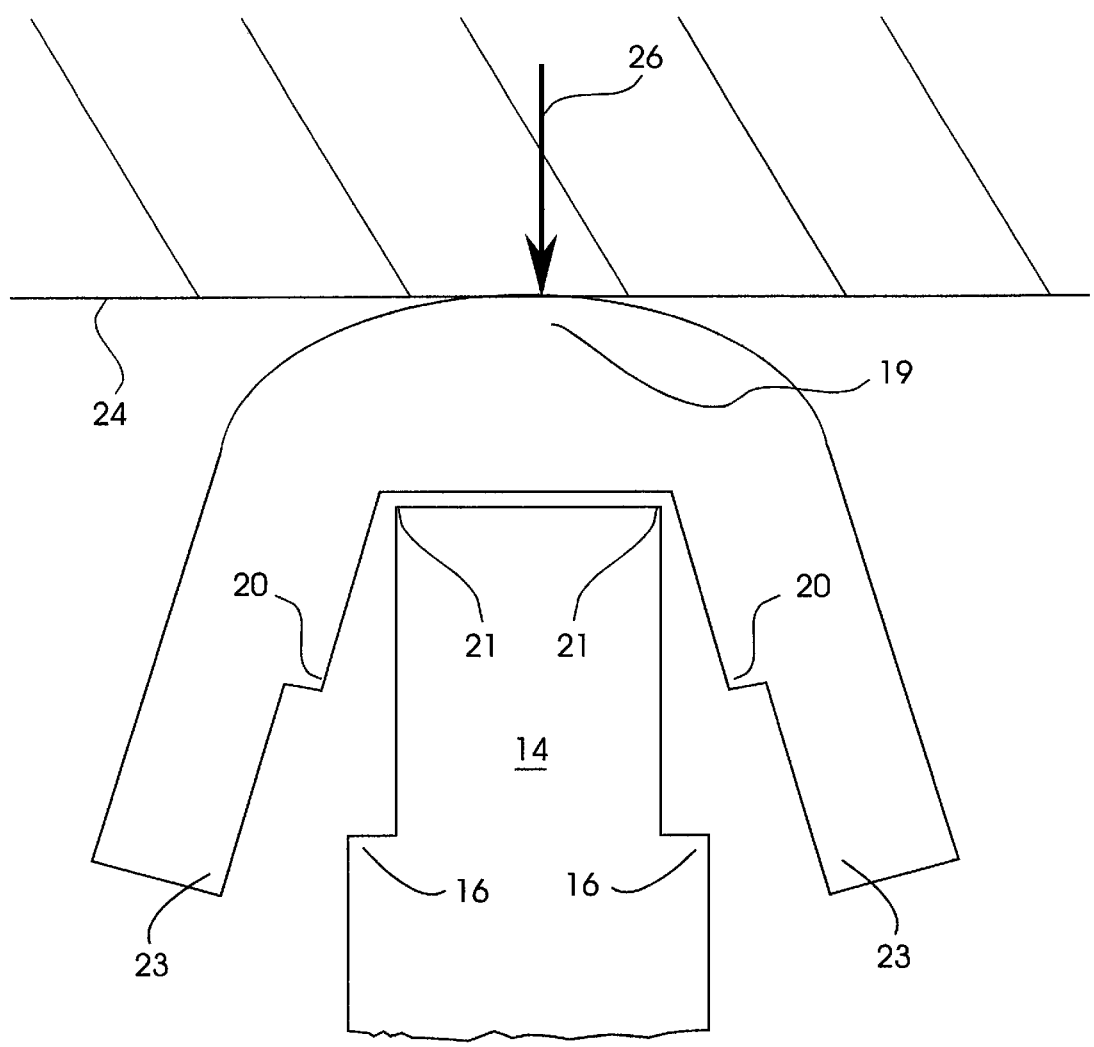
FIG. 4 is a cross-sectional side view of a device according to the invention, similar to the view of FIG. 3, but whose components are in a second cooperative arrangement.

For embodiments where the second member 12 is made of a resilient material, the second member 12 is preferably shaped as per FIG. 3, so that the second member 12 experiences little or no significant deformation from its natural shape.

Where sufficient downward (z axis) force is applied to the device, the second member 12 is deformed as shown in FIG. 4. For instance, when the laptop lid is closed, a display surface 24 exerts, on the second member 12, a downward force represented by a force vector 26.

Responsive to the downward force 26, the deformation of the second member 12 causes the shoulders 20 to spread farther apart, widening the upper opening 22. Also, an upper part 19 of the second member 12 is compressed, both due to the downward z-axis force 26 and due to the widening of the sides of the second member 12. When sufficient downward force causes sufficient widening, the shoulders 20 fall off the edges 21 of the head 14. The head 14 is then inside the upper opening 22.

Depending on the particular shapes of the members 2 and 12, bottom ends 23 of the second member 12 may also be deformed out over the shoulders 16, as shown. However, in a preferred implementation, the shoulders 16 are low enough that, even in the second cooperative arrangement, the bottom ends 23 remain above the shoulders 16.

Since the post 4 remains stationary, the effect is that the second member 12 moves downward onto the post 4. Accordingly, the second member 12 exerts less force on the display surface 24, and is less likely to damage the display surface 24 or the display's inner workings.

It is well-known that, when resilient objects are deformed in shape, they tend to urge themselves back to their normal shape. In the case of the second member 12, the shoulders 20 are urged back closer together, as they were in FIG. 3. This, in effect, urges the second member 12 back upward, so that the shoulders 20 are clear of the edges 21. Therefore, the second member 12 moves back upward to the position of FIG. 3 after the force 26 is removed. Accordingly, when the laptop is reopened (thus removing the force 26 exerted by the display surface 24), the device of the invention returns to its quiescent position (i.e., the first cooperative arrangement), and the device is ready for use.

In a preferred implementation of the invention, the widths of the interior opening 18 are 4.1 and 3.3 mm for the upper part 22 and the lower part, respectively. The head 14 also has a width of 4.1 mm, and a height of 2.6 mm. The height of the upper part 22 is 2 mm, allowing for a downward throw of approximately 2 mm between the first and second configurations. This downward throw has been found to work well in protecting the display surface 24.

Figure 5:
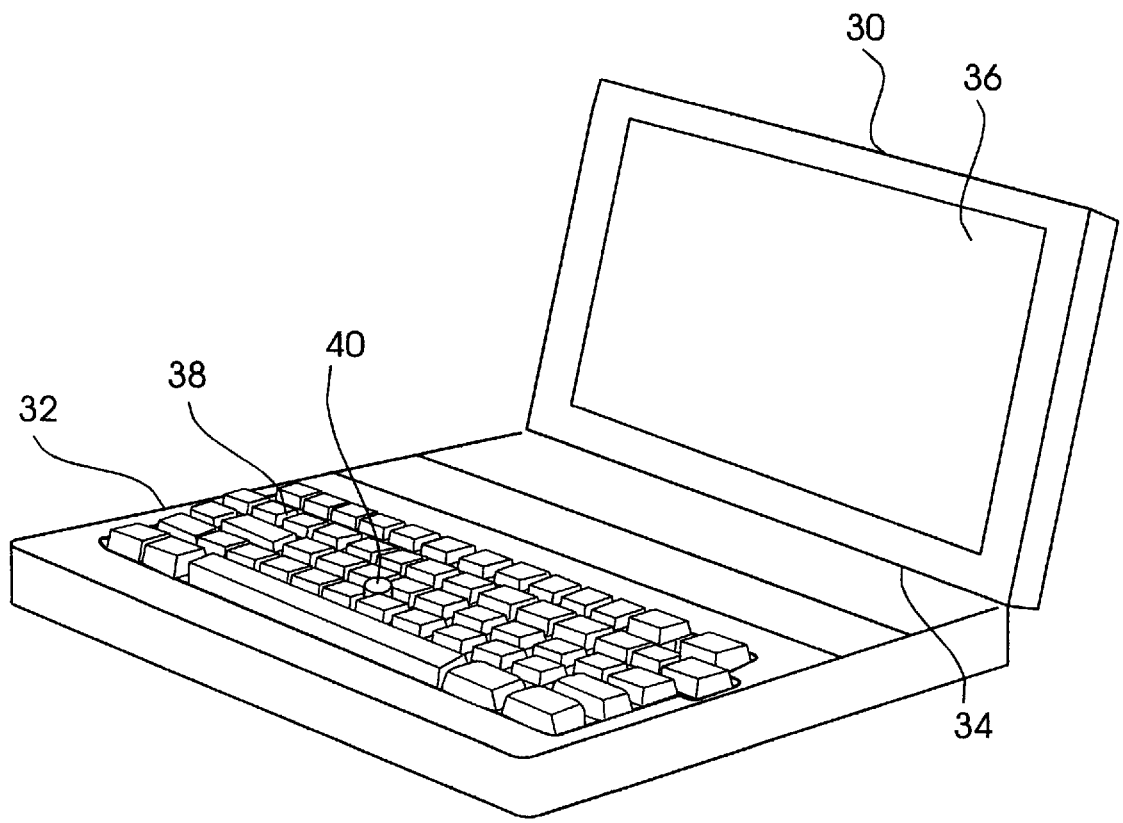
FIG. 5 is a perspective view of a piece of electronic equipment employing a device according to the invention.

FIG. 5 is a perspective view of an electronic device, shown as a laptop computer, employing a device according to the invention. A first portion 30 and a second portion 32 are rotatably coupled together by a hinge mechanism 34, so that, in clamshell fashion, the portions may be moved between open and closed positions. The first portion 30 includes a display such as an LCD-type display 36, which is within the interior of the computer when it is closed, but is accessible to the user's view when the computer is open (as shown). Likewise, the second portion 32 includes user interface apparatus such as a keyboard 38 and a pointing device 40 according to the invention, such as that described in FIGS. 1–4.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. For use with a computer graphical user interface, a fingertip-manipulable pointing device for directing movement of a symbol in a display responsive to user manipulation thereof, the device comprising;

a first member including a post and having a first physical configuration; and a second member including a resilient fingertip grip cap disposed on the post and having a physical configuration such that the second member has first and second possible cooperative arrangements with the first member, the first arrangement being a quiescent monostable arrangement, the second member moving from the first arrangement to the second arrangement responsive to a predetermined application of force thereto, the second member returning from the second arrangement to the first arrangement responsive to removal of the predetermined application of force thereto.

2. A device as recited in claim 1, wherein:

the post includes a head having a predetermined shape;

the grip cap has an interior opening including a first portion having a shape with dimensions so as to fit over the head, and a second portion having a shape with dimensions smaller than the dimensions of the first portion; and the grip cap is made of a resilient material capable of deforming so as to allow the second portion of the interior opening to fit over the head;

wherein, in the first cooperative arrangement, the first portion fits over the head, and the second aperture is open; and whereby, in the second cooperative arrangement, the second portion fits over the head.

3. A device as recited in claim 1, wherein:

the device further includes means for sensing user manipulation thereof; and the post is rigidly coupled to the force sensing mechanism for transmitting the user manipulation thereto.

4. A portable computer comprising;

first and second portions coupled together so as to be movable between a closed position and an open position, a display mounted in the first portion, the display having a display surface enclosed within the computer when the first and second portions are in the closed position and accessible to a user's sight when the first and second portions are in the open position; and a fingertip-manipulable pointing device for directing movement of a symbol in the display responsive to user manipulation thereof, the device being mounted in the second portion, the device being enclosed within the computer when the first and second portions are in the closed position and accessible to a user's manipulation when the first and second portions are in the open position, the device including:

a first member including a post and having a first physical configuration; and a second member including a resilient fingertip grip cap disposed on the post and having a physical configuration such that the second member has first and second possible cooperative arrangements with the first member, the first arrangement being a quiescent monostable arrangement, the second member moving from the first arrangement to the second arrangement responsive to a predetermined application of force thereto, the second member returning from the second arrangement to the first arrangement responsive to removal of the predetermined application of force thereto.

5. A computer as recited in claim 4, wherein:

the post includes a head having a predetermined shape;

the grip cap has an interior opening including a first portion having a shape with dimensions so as to fit over the head, and a second portion having a shape with dimensions smaller than the dimensions of the first portion; and the grip cap is made of a resilient material capable of deforming so as to allow the second portion of the interior opening to fit over the head;

whereby, in the first cooperative arrangement, the first portion fits over the head, and the second aperture is open; and whereby, in the second cooperative arrangement, the second portion fits over the head.

6. A computer as recited in claim 4, wherein:

the device further includes means for sensing user manipulation thereof; and the post is rigidly coupled to the force sensing mechanism for transmitting the user manipulation thereto.

\* \* \* \* \*